(12) United States Patent
Patterson et al.

(10) Patent No.: US 7,556,783 B2
(45) Date of Patent: Jul. 7, 2009

(54) HYDROGEN ISOTOPE FUEL CELL

(75) Inventors: James A. Patterson, 2612 Tanglewood Dr., Sarasota, FL (US) 34239; John A. Thompson, Nassau (BS); Charles E. Entenmann, Key Largo, FL (US); Joyce A. O'Malley, Sarasota, FL (US)

(73) Assignee: James A. Patterson, Sarasato, FL (US), part interest ( * ) Notice: Subject to any disclaimer, the term of this patent is extended or adjusted under 35 U.S.C. 154(b) by 0 days.

(21) Appl. No.: 10/977,595

(22) Filed: Oct. 29, 2004

(65) Prior Publication Data

US 2006/0093874 A1    May 4, 2006

(51) Int. Cl.
*B01J 19/08*    (2006.01)
(52) U.S. Cl. .................................. 422/186.04
(58) Field of Classification Search ............. 422/186.04
See application file for complete search history.

(56) References Cited

U.S. PATENT DOCUMENTS 2,162,505 A * 6/1939 James et al. ............... 313/112
6,797,241 B2 * 9/2004 Foster ................... 422/186.04
2004/0118348 A1 * 6/2004 Mills ................... 118/723 MW
2005/0017644 A1 * 1/2005 Ono et al. ................ 313/633
2005/0146836 A1 * 7/2005 Minnear et al. ............ 361/303

* cited by examiner

*Primary Examiner*—Kishor Mayekar
(74) *Attorney, Agent, or Firm*—Charles J. Prescott

(57) ABSTRACT

An energy conversion cell for converting electric power into heat. The cell includes a non-conductive housing formed of spaced, preferably glass outer plates sealed along common perimeters thereof to define a closed interior volume or chamber. At least two catalytic plates are held spaced apart in the interior volume, preferably separated by a dielectric plate. The catalytic plates are preferably formed of very thin palladium plate material. A gas passage in gas communication with the interior volume is connectable to a source of pressurized hydrogen ($H_2$) or deuterium ($D_2$) gas deliverable into said interior volume. A high voltage a.c. electric power source is connectable through a high voltage step-up transformer between each of the catalytic plates whereby, when a.c. electric current flows through the catalytic plates and across the dielectric plate, the interior volume, being filled with hydrogen or deuterium gas, heat is produced within the interior volume for external use.

8 Claims, 3 Drawing Sheets

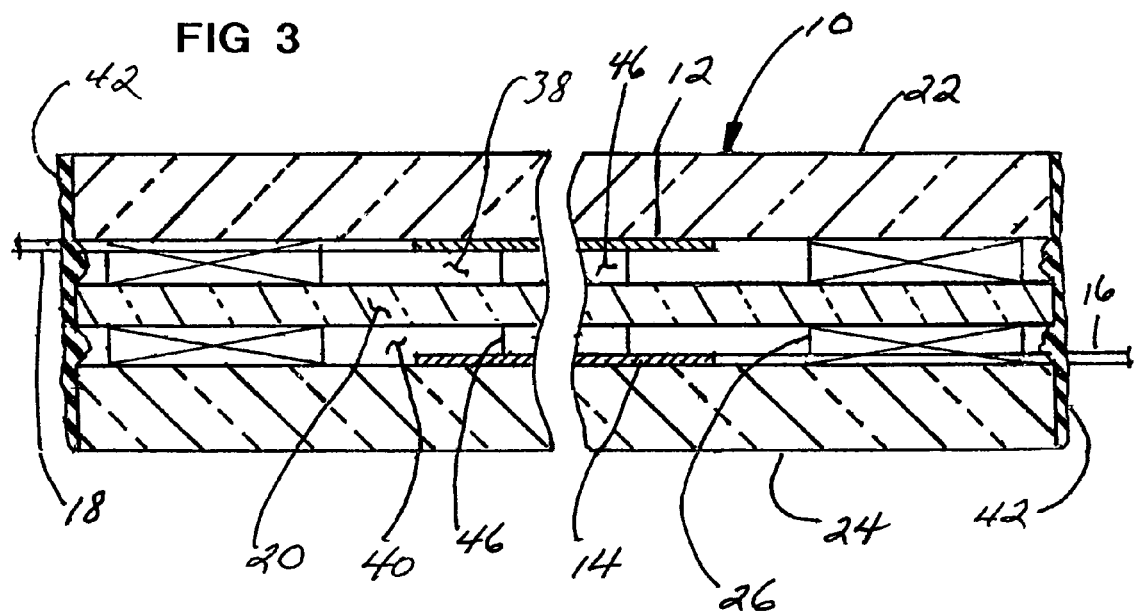
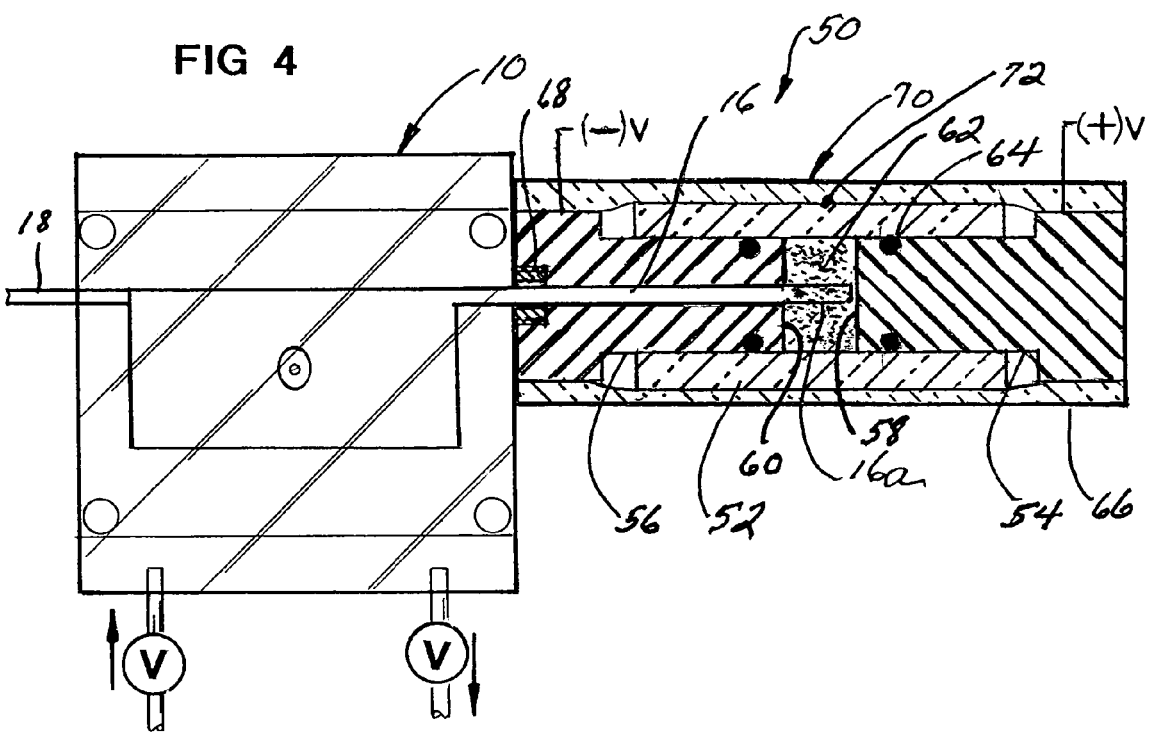

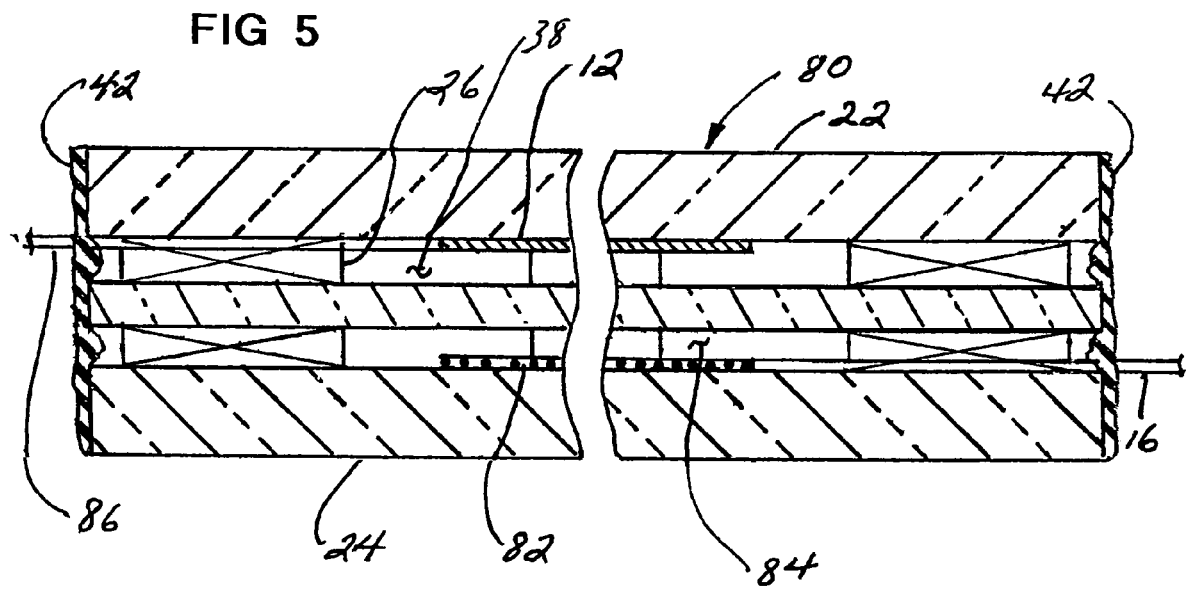

HYDROGEN ISOTOPE FUEL CELL

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to energy conversion units producing heat from electrical current and more particularly to an electrolytic cell utilizing a gaseous hydrogen isotope electrolyte within a sealed chamber filled with catalytic palladium and/or nickel mesh electrodes to produce heat by passing an electric current therebetween.

2. Description of Related Art

The utility of converting electric current into heat for external use is obvious and well known. Common electrolytic cells utilizing a water-based electrolyte wherein an electric current passes through the liquid electrolyte flowing through or held within the electrolytic cell to produce the chemical breakdown of water into hydrogen and oxygen and the production of heat as a byproduct is also well known.

The present invention provides a form of electrolytic cell utilizing a gaseous electrolyte in the form of hydrogen or deuterium gas and spaced catalytic palladium and/or nickel plates. The catalytic plates are chambered within a sealed interior volume of a non-conductive housing and held spaced apart preferably by a dielectric plate. By passing very high voltage a.c. electrical current through the chamber containing the catalytic plates and hydrogen or deuterium gas, heat is produced for external use.

BRIEF SUMMARY OF THE INVENTION

This invention is directed to a hydrogen isotope fuel cell for converting electric power into heat. The cell includes a non-conductive housing formed of spaced, preferably glass outer plates sealed along common perimeters thereof to define a closed interior volume or chamber. At least two catalytic plates are held spaced apart in the interior volume, preferably separated by a dielectric plate. The catalytic plates are preferably formed of very thin palladium plate material. A gas passage in gas communication with the interior volume is connectable to a source of pressurized hydrogen ($H_2$) or deuterium ($D_2$) gas deliverable into said interior volume. A high voltage a.c. electric power source is connectable through a high voltage step-up transformer between each of the catalytic plates whereby, when a.c. electric current flows through the catalytic plates and across the dielectric plate, the interior volume, being filled with hydrogen or deuterium gas, heat is produced within the interior volume for external use.

It is therefore an object of this invention to provide a heat producing gaseous electrolyte-based electrolytic cell.

It is yet another object of this invention is to produce a hydrogen or deuterium gas electrolyte activated electrolytic cell for producing heat for external use.

Still another object of this invention is to provide a hydrogen isotope fuel cell for converting high voltage, low current electrical energy into heat energy.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 3 is a broken section view in the direction of arrows 3-3 in FIG. 1.

FIG. 4 is a front elevation simplified view of another embodiment of the invention.

FIG. 5 is a broken section view similar to FIG. 3 showing an alternate embodiment thereof.

DETAILED DESCRIPTION OF THE INVENTION

Figure 2:
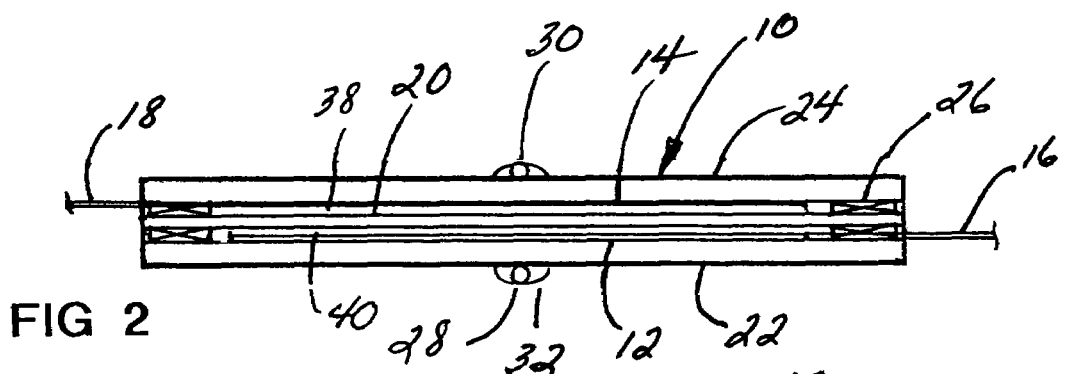
FIG. 2 is a top plan or edge view of FIG. 1.
Figure 1:
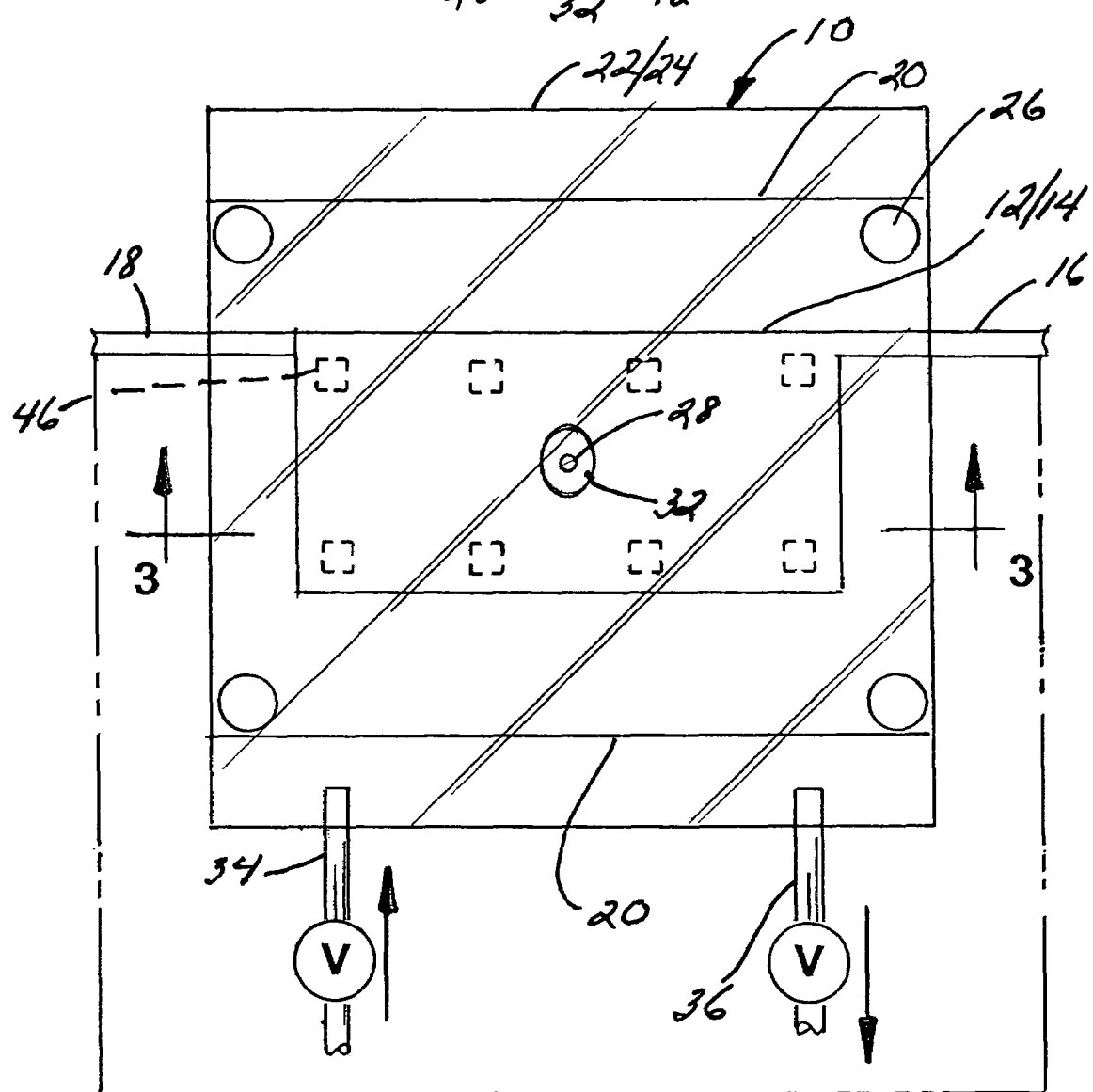
FIG. 1 is a front elevation simplified view of a preferred embodiment of an electrolytic hydrogen isotope fuel cell in accordance with the present invention.

Referring now to FIGS. 1 to 3, an electrolytic hydrogen isotope fuel cell in accordance with the present invention is there shown generally at numeral 10. This cell 10 includes a non-conductive cylindrical housing formed of preferably transparent flat glass outer plates 22 and 24. This housing 12 is formed of vitreous lab-quality plate glass having a thickness of ⅛", a width of 4⅛" and a length of 4⅛", producing a total chamber or interior volume of $3.19"^3$.

Positioned within the interior volume 38/40 are two spaced apart flat catalytic plates 12 and 14. Each of these catalytic plates 12 and 14 have a size of 1⅜" by 3" and have a thickness of 1/64" and are formed of substantially 99% pure jewelry grade palladium. These catalytic plates 12 and 14 are spaced centrally between and against the outer non-conductive plates 22 and 24 and are held spaced apart by thin 3/64" thick glass non-conductive spacers 46 and a dielectric plate 20. This dielectric plate 20 is formed of VICOR transparent glass for higher heat resistive properties having the dimensions of 1/16" thick by 3" by 4⅛" and is positioned centrally between the outer plates 22 and 24.

The outer surfaces of the dielectric plate 20 are also spaced evenly between the inner surfaces of the outer plates 22 and 24 by four non-conductive spacers 26 positioned in close proximity to each of the four corners of the dielectric plate 20. These spacers 26 are formed of uncured, flowable silicone to help to hold the entire assembly together as a unit as shown.

Each of the conductive plates 12 and 14 have integrally formed elongated contact strips 16 and 18, respectively, which extend laterally beyond one side perimeter of the corresponding outer non-conductive plate 22 or 24 as shown. These contact strips 16 and 18 are formed as a unit with each of the corresponding catalytic plates 12 and 14, respectively, and are connected to the output side 44b of a voltage step-up transformer 44. The input side 44a of this step-up transformer 44 receives a.c. voltage from a suitable variable power source in the range of up to about 200V a.c. This step-up transformer 44 is a luminous tube-type transformer originally manufactured by Magnetek/Jefferson Electric, catalog No. 721-121-400 rated at 120V/60 hz/360 va and having an actual voltage step-up of approximately 33 to 34:1 transformer output voltage into the cell were measured using a Fluke 87 III multimeter and a Fluke 80K-40HV probe measuring true RMS voltage so that, for example, at the steady the steady input V a.c. of in the range of 100-150 volts into the input side 44*a*, the output side 44*b* would provide voltage to the contact strip 16 and 18 of in the range of 6800 to 10200 v.a.c. This voltage to the cell is sufficient to produce a blue-colored glow or corona around the edges of the catalytic plates.

To achieve an air gap between the dielectric plate 20 and each of the catalytic plates 12 and 14 which are positioned against the inner surface of the corresponding outer plates 22 and 24, respectively, glass non-conductive spacers 46, each approximately ¼" square and having a thickness of approximately ³⁄₆₄" are adhered in spaced apart fashion between these two members and forming a portion of the interior volume 38/40.

The interior volume 38/40 is sealed by applying a layer of "superblue" high temperature silicone gasket maker shown at 42 which is applied along all of the perimeter edges of the cell 10 as seen in FIG. 3. Care is taken in applying the silicone 42 to completely seal each of the contact strips 16 and 18 as they exit from between the outer plates 22 and 24, as well as the inlet and outlet tubes 34 and 36, respectively. By this arrangement, the entire interior volume 38/40 and the catalytic plates 12 and 14 positioned therewithin astride of the dielectric plate 20 are completely sealed from atmospheric conditions except as provided from the inlet and outlet tubes 34 and 36 through the corresponding valves V in the direction of the corresponding arrows.

To monitor the operating temperature of the cell 10, thermocouples 28 and 30 are epoxied onto a central area of the outer surfaces of each of the outer plates 22 and 24 and held in place by a blob of cured epoxy 32. An appropriate reading device of temperature through these thermocouples 28 and 30 is provided (not shown).

The interior volume 38/40 is first held at atmospheric pressure at ambient temperature during the calibration or uncharged operation of each cell 10 wherein input a.c. voltage and current into the transformer 44, along with outside surface temperatures at thermocouples 28 and 30 are taken. Thereafter, the air is evacuated by forcing a quantity of either deuterium gas or hydrogen gas into an inlet tube 34, the air exiting through an outlet tube 36, each of which is in fluid communication with the interior volume 38/40. When the interior volume 38/40 is fully filled or charged with either deuterium or hydrogen gas provided from a separate supply tank (not shown), the valves V are each closed to seal off any further fluid flow through either of the inlet or outlet tubes 34 or 36, respectively.

Referring now to FIG. 4, an alternate embodiment of the invention is there shown generally at numeral 50. This embodiment includes the catalytic cell 10 as previously described, coupled to a second catalytic cell shown generally at numeral 70. This secondary cell 70 generally functions as a deuteride collector and includes conductive (preferably brass) end members 54 and 56 fitted into each end of a non-conductive tubular housing 52 and are sealably engaged against the inside diameter of the tubular housing 52 by elastomeric O-rings 64. A conductive brass adaptor 68 is fitted into threaded engagement with a mating aperture in the outer end of end member 56. This adaptor 68 has a longitudinally extending aperture therethrough into which the elongated conductive contact strip 16 longitudinally extends into a bed of closely packed catalytic particles 34 positioned between the proximal end faces 58 and 60 of each of the end members 54 and 56. Details of the composition of these catalytic particles 34 and the method of compressing them are discussed herebelow.

A d.c. voltage source is applied during operation of cell 70 between each of the conductive end members 54 and 56 with polarity as shown. The chamber which contains the catalytic particles 62 may be completely closed to atmosphere during operation of the cell 70 or may be opened to atmosphere.

A thermocouple 72 may be placed directly against the outer surface of the non-conductive housing 52 and in close proximity to the center of the catalytic particles 62. A temperature readout is provided which will read the surface temperature of the housing 52. A layer of insulation 66, although now not preferred, may be wrapped around the housing 52. This insulation 66 is held in place by at least one wrap of non-conductive tape such as duct tape and is provided for more accurate and consistent temperature readings.

Conductive Particles

The catalytic particles 62 are preferably formed from palladium crystals or palladium black as pure particle forms of palladium. Mixed uniformly with the palladium particles is either a powder form of diatomaceous earth or powdered ceramic material which increases electrical resistance.

Pd/DE Mixture

In preparing the palladium/diatomaceous earth (DE) form of the catalytic particles 2.5 grams of DE were placed in a clean crucible and heated to 800° c. A solution of Pd, $Cl_2$/Acetone was mixed and stirred with the DE to form a paste which was dried in a Bell jar over $CaCl_2$. This process of applying heat and stirring continued until a dry red-colored brick was obtained. The dried brick was then screened to dry powder having a uniform size of approximately 0.25 mm. Heat was then applied at 700° C. for approximately 24 hours. Thereafter, the mixture was placed in a hydrogen atmosphere furnace for approximately four hours at 320° C. The resultant particles were flushed with $N_2$ after cooling, after which the mixture was weighed. The above process was repeated until a weight of 12 grams was achieved. The mixture was then ground and screened through a 0.25 mm mesh screen.

Pd Black/Ceramic Mixture

Palladium black powder and a ceramic powder were mixed together with distilled water to make a paste. Mixing continues to eliminate all stratification of the two substances. Utilizing a vacuum pump and a suction device, the paste was suctioned until it formed a fine black powder. This process took approximately three hours depending on the capacity of the vacuum pump. This powder is describable as being delatency, i.e. one which, under stress, produces a mixture appearing as a solid; when the stress is relieved, it has a slight appearance of that of a liquid.

Chamber Loading

Approximately 1 cc of one of the above-described catalytic particle mixture was loaded into the chamber formed between the proximate opposing faces 58 and 60 of each of the conductive end members 54 and 56 within the cylindrical housing 52. The catalytic particles 62 were placed within the chamber in several stages or layers totaling more than one and preferably five to ten layers. A small quantity (approximately ⅕ of the total of the catalytic particles) was placed into the chamber with the cylindrical housing 52 in an upright orientation and only one of the end members 54 or 56 in place. The conductive particles were tamped with a 1 kg load for approximately 2-5 minutes after each layer of the conductive particles were placed within the chamber. The total length of the chamber was approximately 10 mm.

Diatomaceous Earth-Boron-Palladium Mixture

A mixture of 1.9 grams of diatomaceous earth in a form as previously described, in combination with 0.1 grams of elemental boron in granulated form is added to the diatomaceous earth before the addition of 6.8 grams of palladium chloride. The boron powder is added to facilitate operation of the cell and should have a particle size in the range of that previously described with respect to the diatomaceous earth.

Referring lastly to FIG. 5, an alternate embodiment to that shown at numeral 10 in FIGS. 1 to 3, is there shown generally at numeral 80. This embodiment 70 is generally similar to the embodiment of FIG. 1 except that one of the conductive plates 12 in FIG. 1 has been replaced with a nickel mesh conductive plate 82 having an outwardly extending contact strip or tab 86. This conductive plate 82 has the same overall size and elongated contact strip 76 as previously described. However, this nickel mesh catalytic plate 82 is formed of nickel mesh having a thickness of 0.005" and a strand diameter of 0.007" and is available from the Exmet Corporation of Naugatuck, Conn. under their product #5N17-5\0. The same interior volume portions 38 and 84 are provided as previously described.

Testing Results

The calibration or the uncharged testing of the embodiment 10 of the invention shown in FIG. 1 to 3 is shown in Table I herebelow. The columns reflect the a.c. voltage (Vac) and current (Iac) applied into the inlet side 44a of transformer 44. The wattage input (VXI) is also shown along with the average temperature on the outer surface of the cell average between thermocouples 30 and 32.

TABLE I

| Vac | Iac | V × I | T avg ° C. |
|---|---|---|---|
| Pd—Pd Uncharged | | | |
| 26.62 | 1.257 | — | — |
| 22.84 | .803 | 18.34 | 30.25 |
| 24.31 | .928 | 22.56 | 30.95 |
| 25.50 | 1.085 | 27.67 | 32.05 |
| 26.55 | 1.248 | 33.16 | 33.60 |
| Deuterium - Charged | | | |
| 25.63 | 1.139 | 29.19 | 56.25 |
| 25.64 | 1.135 | 29.10 | 73.30 |
| 25.64 | 1.135 | 29.10 | 80.30 |
| 25.66 | 1.134 | 29.10 | 85.85 |
| 26.13 | 1.166 | 30.47 | 80.35 |
| 26.02 | 1.161 | — | — |
| 25.98 | 1.159 | 30.11 | 88.1 |
| 25.97 | 1.157 | 30.05 | 89.85 |

This cell 10 tested in Table I was initially tested in the uncharged condition wherein the cell was filled with air or nitrogen at atmospheric pressure. Thereafter, the cell and the interior volume defined at 38 and 40 was filled with deuterium at atmospheric pressure and sealed closed y values 34 and 36 of FIG. 1. Note that a significant higher cell operating temperature is achieved when charged with deuterium.

A second cell was also tested of the construction shown and described with respect to FIGS. 1 to 3, the uncharged and deuterium charged testing results shown in Table II. Additional columns of data reflect the RMS power input to the cell separate from the straight calculation of watts in VxI and both temperature readings taken from thermocouples 30 and 32 are shown along with the average of those readings. Again, note substantially higher cell operating temperatures achieved when charged with deuterium.

TABLE II

| Vac | Iac | V × I | Watts | T₁ ° C. | T₂ ° C. | T avg ° C. |
|---|---|---|---|---|---|---|
| Uncharged | | | | | | |
| 99.1 | .268 | 26.6 | 14.0 | 42.2 | 42.3 | 42.15 |
| 106.7 | .302 | 32.2 | 16.0 | 45.9 | 46.1 | 45.00 |
| 113.1 | .343 | 38.8 | 18.0 | 48.8 | 49.0 | 48.90 |
| 119.5 | .390 | 46.5 | 20.0 | 50.8 | 51.0 | 50.90 |
| 127.2 | .475 | 60.4 | 23.0 | 54.9 | 55.1 | 55.00 |
| Deuterium-Charged | | | | | | |
| 126.5 | .463 | 58.6 | 23.0 | 59.1 | 59.2 | 59.15 |
| 126.3 | .459 | 58.0 | 23.0 | 61.7 | 61.9 | 61.80 |
| 139.7 | .761 | 106.3 | 30.0 | 80.0 | 80.3 | 80.15 |
| 139.3 | .752 | 104.8 | 30.0 | 82.7 | 83.0 | 82.85 |
| 138.6 | .741 | 102.7 | 30.0 | 87.7 | 88.0 | 87.85 |
| 137.7 | .718 | 99.0 | 30.0 | 91.9 | 92.2 | 91.05 |
| 136.0 | .665 | 90.4 | 30.0 | 99.6 | 100.0 | 99.80 |
| 129.3 | .530 | 68.5 | 30.0 | 111.8 | 112.6 | 112.20 |

The embodiment 80 of the invention shown in FIG. 5 utilizing the there-above described nickel mesh and flat palladium plate catalytic members 12 and 82 combination was tested both in the uncharged or atmospheric condition and, thereafter, charged with deuterium at atmospheric pressure in sealed fashion to produce the results shown in the later portion of Table III.

TABLE III

| Vac | Iac | V × I | T avg ° C. |
|---|---|---|---|
| Pd—Ni Mesh Uncharged | | | |
| 85.7 | 0.20 | 17.14 | 36.0 |
| 106.8 | 0.30 | 32.04 | 42.3 |
| 122.9 | 0.40 | 49.16 | 47.0 |
| 131.2 | 0.50 | 65.6 | 50.2 |
| 136.6 | 0.60 | 81.96 | 53.0 |
| Deuterium - Charged | | | |
| 136.6 | 0.60 | 81.96 | 61.1 |
| 136.6 | 0.60 | 81.96 | 62.1 |
| 136.6 | 0.60 | 81.96 | 68.0 |
| 136.6 | 0.60 | 81.96 | 70.3 |
| 136.6 | 0.60 | 81.96 | 71.9 |
| 136.6 | 0.60 | 81.96 | 73.1 |
| 136.6 | 0.60 | 81.96 | 76.1 |
| 136.6 | 0.60 | 81.96 | 76.5 |
| 136.6 | 0.60 | 81.96 | |
| 16 hour soak after adding more D₂ | | | |
| 136.6 | 0.60 | 81.96 | 67.8 |
| 136.6 | 0.60 | 81.96 | 68.2 |
| 144.1 | 0.80 | 115.3 | 82.2 |

Here again, higher operating temperatures were achieved when the cell was charged with deuterium. Because hydrogen has very similar properties to those of deuterium, cell performance charged with hydrogen gas is presumed to be similar in increased operating temperatures as well.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. An energy conversion system comprising:
   a sealed cell including a non-conductive housing formed of spaced apart plates sealed along common peripheral margins to define a sealed interior volume;
   said cell also including two flat solid conductive catalytic plates positioned within said interior volume and held substantially parallel and spaced apart by a flat dielectric plate therebetween;
   a quantity of hydrogen or deuterium gas in said sealed interior volume; and
   a high voltage a.c. electric power source for supplying current between said catalytic plates and configured to produce a glow or corona and to produce heat within said interior volume for use external of said housing.

2. An energy conversion system as set forth in claim 1, wherein:
   said conductive plates are formed of palladium.

3. An energy conversion system as set forth in claim 1, wherein:
   one of said conductive plates is formed of nickel mesh material.

4. An energy conversion system as set forth in claim 1, wherein:
   said conductive plates are formed of nickel mesh material.

5. An energy conversion apparatus for producing heat from electric power, comprising:
   an interior volume formed between non-conductive outer side walls spaced apart and separated one from another, common perimeters of said side walls sealed to form a sealed said interior volume;
   two conductive catalytic plates held in spaced apart relationship within said interior volume on either side of a flat dielectric plate;
   a quantity of hydrogen ($H_2$) or deuterium ($D_2$) gas within and filling said interior volume; and
   an a.c. electric power source for supplying current between said catalytic plates and is configured to produce a glow or corona and to produce heat within said interior volume for external use.

6. An energy conversion apparatus as set forth in claim 5, wherein:
   said conductive plates are formed of palladium.

7. An energy conversion apparatus as set forth in claim 5, wherein:
   one of said conductive plates is formed of nickel mesh material.

8. An energy conversion apparatus as set forth in claim 5, wherein:
   said conductive plates are formed of nickel mesh material.

* * * * *